US008590900B2

(12) United States Patent
Yoseloff

(10) Patent No.: US 8,590,900 B2
(45) Date of Patent: Nov. 26, 2013

(54) METHODS OF PLAYING WAGERING GAMES

(71) Applicant: Mark L. Yoseloff, Henderson, NV (US)

(72) Inventor: Mark L. Yoseloff, Henderson, NV (US)

(73) Assignee: SHFL entertainment, Inc., Las Vegas, NV (US)

( * ) Notice: Subject to any disclaimer, the term of this patent is extended or adjusted under 35 U.S.C. 154(b) by 0 days.

(21) Appl. No.: 13/631,825

(22) Filed: Sep. 28, 2012

(65) Prior Publication Data

US 2013/0029736 A1 Jan. 31, 2013

Related U.S. Application Data

(63) Continuation-in-part of application No. 13/399,141, filed on Feb. 17, 2012, which is a continuation of application No. 11/108,159, filed on Apr. 15, 2005, now abandoned, which is a continuation-in-part of application No. 10/938,483, filed on Sep. 10, 2004, now Pat. No. 7,264,243.

(51) Int. Cl.
*A63F 1/00* (2006.01)
*A63F 13/00* (2006.01)

(52) U.S. Cl.
USPC .............................. 273/292; 273/274; 463/13

(58) Field of Classification Search
USPC ....................... 273/292, 274, 309; 463/13, 12
See application file for complete search history.

(56) References Cited

U.S. PATENT DOCUMENTS

| | | | |
|---|---|---|---|
| 1,238,736 | A | 9/1917 | Barrett |
| 1,527,929 | A | 2/1925 | Simons |
| 1,763,476 | A | 6/1930 | Morris |
| 1,970,876 | A | 8/1934 | Anderson |
| 2,008,829 | A | 7/1935 | Israel |
| 2,199,745 | A | 5/1940 | Harris |
| 3,011,789 | A | 12/1961 | Eliassen |

(Continued)

FOREIGN PATENT DOCUMENTS

| | | |
|---|---|---|
| AU | 200135060 | 10/2001 |
| DE | 2830216 | 1/1980 |

(Continued)

OTHER PUBLICATIONS

Card Craps, Scarne's Encyclopedia of Card Games, pp. 321-323, (1948).

(Continued)

*Primary Examiner* — Benjamin Layno
(74) *Attorney, Agent, or Firm* — Fenwick & West LLP

(57) ABSTRACT

A card game is played against a pay table, wherein a player receives a partial hand that is preferably completed by community cards, but may be completed by cards dealt directly to a hand or a combination of cards dealt directly to a hand and at least one community card or wild card. After placement of an ante wager, each player will have an opportunity to place a game wager before receiving another card for the player's hand (whether dealt directly to the player or as a community card revealed to all players). At least some or all game wagers may be an amount within a range of multiples of the player's ante wager, such as one times, two times, three times, four times, or five times the amount of the ante wager. The range of wagers may remain the same or vary with the number of dealt cards or community card revealed to the players.

18 Claims, 5 Drawing Sheets

(56) References Cited

U.S. PATENT DOCUMENTS

| | | | |
|---|---|---|---|
| 3,269,503 | A | 8/1966 | Foster |
| 3,556,531 | A | 1/1971 | Clarence |
| 3,663,021 | A | 5/1972 | Whippo |
| 3,667,757 | A | 6/1972 | Holmberg |
| 3,689,071 | A | 9/1972 | Kucera |
| 3,796,433 | A | 3/1974 | Bell et al. |
| 3,825,255 | A | 7/1974 | Kennard |
| 3,876,208 | A | 4/1975 | Wachtler et al. |
| 4,063,680 | A | 12/1977 | Leo |
| 4,099,722 | A | 7/1978 | Rodesch et al. |
| 4,232,866 | A | 11/1980 | Pennachio |
| 4,302,012 | A | 11/1981 | Di Giovanni et al. |
| 4,305,586 | A | 12/1981 | Richards |
| 4,364,567 | A | 12/1982 | Goolt |
| 4,397,469 | A | 8/1983 | Carter |
| 4,518,001 | A | 5/1985 | Branham |
| 4,531,187 | A | 7/1985 | Uhland et al. |
| 4,575,085 | A | 3/1986 | Ollington |
| 4,614,342 | A | 9/1986 | Takashima |
| 4,624,459 | A | 11/1986 | Kaufman et al. |
| 4,648,604 | A | 3/1987 | Horan |
| 4,651,997 | A | 3/1987 | Wood |
| 4,700,948 | A | 10/1987 | Okada |
| 4,721,307 | A | 1/1988 | Okada |
| 4,743,022 | A | 5/1988 | Wood |
| 4,756,531 | A | 7/1988 | Dire et al. |
| 4,759,549 | A | 7/1988 | Beckwith |
| 4,760,527 | A | 7/1988 | Sidley |
| 4,813,675 | A | 3/1989 | Greenwood |
| 4,836,546 | A | 6/1989 | Dire et al. |
| 4,836,553 | A | 6/1989 | Suttle et al. |
| 4,837,728 | A | 6/1989 | Barrie et al. |
| 4,861,041 | A | 8/1989 | Jones et al. |
| 4,948,134 | A | 8/1990 | Suttle et al. |
| 4,964,638 | A | 10/1990 | Ishida |
| 5,022,653 | A | 6/1991 | Suttle et al. |
| 5,046,736 | A | 9/1991 | Bridgeman et al. |
| 5,078,405 | A | 1/1992 | Jones et al. |
| 5,098,107 | A | 3/1992 | Boylan et al. |
| 5,100,137 | A | 3/1992 | Fulton |
| 5,112,060 | A | 5/1992 | Jones |
| 5,167,413 | A | 12/1992 | Fulton |
| 5,174,579 | A | 12/1992 | Griffiths |
| 5,221,083 | A | 6/1993 | Dote |
| 5,242,163 | A | 9/1993 | Fulton |
| 5,251,897 | A | 10/1993 | Fulton |
| 5,255,915 | A | 10/1993 | Miller |
| 5,257,784 | A | 11/1993 | Boylan et al. |
| 5,257,810 | A | 11/1993 | Schorr et al. |
| 5,265,877 | A | 11/1993 | Boylan et al. |
| 5,275,415 | A | 1/1994 | Wisted |
| 5,288,077 | A | 2/1994 | Jones et al. |
| 5,288,081 | A | 2/1994 | Breeding |
| 5,294,128 | A | 3/1994 | Marquez |
| 5,308,065 | A | 5/1994 | Bridgeman et al. |
| 5,322,295 | A | 6/1994 | Cabot et al. |
| 5,324,035 | A | 6/1994 | Morris et al. |
| 5,337,973 | A | 8/1994 | Matsumoto et al. |
| 5,364,104 | A | 11/1994 | Jones |
| 5,366,228 | A | 11/1994 | Kangsanaraks |
| 5,377,973 | A | 1/1995 | Jones et al. |
| 5,377,993 | A | 1/1995 | Josephs |
| 5,377,994 | A | 1/1995 | Jones |
| 5,395,120 | A | 3/1995 | Malek |
| 5,397,128 | A | 3/1995 | Hesse et al. |
| 5,411,257 | A | 5/1995 | Fulton |
| 5,417,430 | A | 5/1995 | Breeding |
| 5,423,551 | A | 6/1995 | Stavinsky |
| 5,431,408 | A | 7/1995 | Adams |
| 5,437,451 | A | 8/1995 | Fulton |
| 5,489,101 | A | 2/1996 | Moody |
| 5,494,295 | A | 2/1996 | Potter et al. |
| 5,505,449 | A | 4/1996 | Eberhardt et al. |
| 5,531,448 | A | 7/1996 | Moody |
| 5,538,252 | A | 7/1996 | Green |
| 5,584,486 | A | 12/1996 | Franklin |
| 5,597,162 | A | 1/1997 | Franklin |
| 5,630,757 | A | 5/1997 | Gagin et al. |
| 5,636,842 | A | 6/1997 | Cabot et al. |
| 5,649,705 | A | 7/1997 | String |
| 5,653,444 | A | 8/1997 | Dahl |
| 5,657,993 | A | 8/1997 | Merlino et al. |
| 5,660,393 | A | 8/1997 | Dreger |
| 5,673,917 | A | 10/1997 | Vancura |
| 5,685,774 | A | 11/1997 | Webb |
| 5,697,614 | A | 12/1997 | Potter et al. |
| 5,711,525 | A | 1/1998 | Breeding |
| 5,718,430 | A | 2/1998 | Arampakul et al. |
| 5,732,950 | A | 3/1998 | Moody |
| 5,752,702 | A | 5/1998 | McDoniel |
| 5,762,340 | A | 6/1998 | Feola |
| 5,806,855 | A | 9/1998 | Cherry |
| 5,810,354 | A | 9/1998 | Banyai |
| 5,820,460 | A | 10/1998 | Fulton |
| 5,823,873 | A | 10/1998 | Moody |
| 5,830,069 | A | 11/1998 | Soltesz et al. |
| 5,851,011 | A | 12/1998 | Lott |
| 5,865,437 | A | 2/1999 | Moore |
| 5,876,283 | A | 3/1999 | Parra et al. |
| 5,897,436 | A | 4/1999 | Singer et al. |
| 5,901,958 | A | 5/1999 | Andrews |
| 5,928,081 | A | 7/1999 | Bochichio et al. |
| 5,944,315 | A | 8/1999 | Mostashari |
| 5,975,529 | A | 11/1999 | de Keller |
| 5,988,643 | A | 11/1999 | Awada |
| 5,999,808 | A | 12/1999 | Ladue |
| 6,012,719 | A | 1/2000 | Webb |
| 6,019,374 | A | 2/2000 | Breeding |
| 6,027,119 | A | 2/2000 | De Lisle |
| 6,042,118 | A | 3/2000 | Poitra |
| 6,056,641 | A | 5/2000 | Webb |
| 6,098,984 | A | 8/2000 | Moore |
| 6,098,985 | A | 8/2000 | Moody |
| 6,102,402 | A | 8/2000 | Scott et al. |
| 6,113,101 | A | 9/2000 | Wirth |
| 6,113,103 | A | 9/2000 | Mostashari |
| 6,149,154 | A | 11/2000 | Grauzer et al. |
| 6,170,827 | B1 | 1/2001 | Lombardo et al. |
| 6,196,918 | B1 | 3/2001 | Miers et al. |
| 6,206,373 | B1 | 3/2001 | Garrod |
| 6,206,374 | B1 | 3/2001 | Jones et al. |
| 6,206,780 | B1 | 3/2001 | Awada |
| 6,229,534 | B1 | 5/2001 | Gerra et al. |
| 6,237,916 | B1 | 5/2001 | Webb |
| 6,270,079 | B1 | 8/2001 | Chamberlain |
| 6,273,424 | B1 | 8/2001 | Breeding |
| 6,279,910 | B1 | 8/2001 | De Keller |
| D452,283 | S | 12/2001 | Regan, II et al. |
| 6,332,614 | B1 | 12/2001 | Hesse |
| 6,334,614 | B1 | 1/2002 | Breeding |
| 6,336,859 | B2 | 1/2002 | Jones et al. |
| 6,345,823 | B1 | 2/2002 | Webb |
| 6,375,189 | B1 | 4/2002 | Jones |
| 6,406,024 | B1 | 6/2002 | Perkins |
| 6,409,602 | B1 | 6/2002 | Wiltshire et al. |
| 6,428,005 | B2 | 8/2002 | Au-Yeung |
| 6,467,771 | B1 | 10/2002 | De Keller |
| 6,478,675 | B1 | 11/2002 | Awada |
| 6,485,368 | B2 | 11/2002 | Jones et al. |
| 6,517,072 | B1 | 2/2003 | McInerney |
| 6,517,074 | B1 | 2/2003 | Moody et al. |
| 6,561,897 | B1 | 5/2003 | Bourbour et al. |
| 6,568,680 | B1 | 5/2003 | Moody et al. |
| 6,581,936 | B1 | 6/2003 | Zoccolillo et al. |
| 6,588,750 | B1 | 7/2003 | Grauer et al. |
| 6,607,443 | B1 | 8/2003 | Miyamoto et al. |
| 6,637,747 | B1 | 10/2003 | Garrod |
| 6,651,981 | B2 | 11/2003 | Grauzer et al. |
| 6,651,982 | B2 | 11/2003 | Grauzer et al. |
| 6,652,377 | B1 | 11/2003 | Moody |
| 6,655,684 | B2 | 12/2003 | Grauzer et al. |
| 6,698,759 | B2 | 3/2004 | Webb et al. |
| 6,705,943 | B2 | 3/2004 | Awada |
| 6,712,702 | B2 | 3/2004 | Goldberg et al. |

(56) References Cited

U.S. PATENT DOCUMENTS

| | | | |
|---|---|---|---|
| 6,719,291 | B1 | 4/2004 | De Keller |
| 6,726,564 | B2 | 4/2004 | Hogan et al. |
| 6,749,200 | B2 | 6/2004 | Yurkins |
| 6,752,394 | B2 | 6/2004 | Malcolm |
| 6,802,773 | B2 | 10/2004 | Moody |
| 6,811,153 | B1 | 11/2004 | Ko |
| 6,827,348 | B1 | 12/2004 | Mitchell |
| 6,869,076 | B1 | 3/2005 | Moore |
| 6,896,265 | B1 | 5/2005 | Schlumbrecht |
| 6,923,446 | B2 | 8/2005 | Snow |
| 6,929,264 | B2 | 8/2005 | Huard et al. |
| 6,955,356 | B2 | 10/2005 | Moody |
| 6,959,928 | B2 | 11/2005 | Schultz |
| 6,964,418 | B2 | 11/2005 | Moody |
| 6,986,514 | B2 | 1/2006 | Snow |
| D518,112 | S | 3/2006 | Abbott et al. |
| D519,164 | S | 4/2006 | Austin |
| 7,029,011 | B2 | 4/2006 | Strong et al. |
| 7,175,522 | B2 | 2/2007 | Hartl |
| 7,189,161 | B1 | 3/2007 | Wiltshire et al. |
| 7,246,799 | B2 | 7/2007 | Snow |
| D548,799 | S | 8/2007 | Looney et al. |
| 7,264,243 | B2 | 9/2007 | Yoseloff et al. |
| 7,331,580 | B2 | 2/2008 | Scibetta |
| 7,387,300 | B2 | 6/2008 | Snow |
| 7,661,676 | B2 | 2/2010 | Smith et al. |
| 2001/0040345 | A1 | 11/2001 | Au-Yeung |
| 2001/0048197 | A1 | 12/2001 | Lo |
| 2002/0008356 | A1 | 1/2002 | de Keller |
| 2002/0103018 | A1 | 8/2002 | Rommerdahl et al. |
| 2002/0113371 | A1 | 8/2002 | Snow |
| 2002/0175468 | A1 | 11/2002 | Kenny et al. |
| 2002/0195775 | A1 | 12/2002 | Webb et al. |
| 2003/0042679 | A1 | 3/2003 | Snow |
| 2003/0050106 | A1 | 3/2003 | Lyfoung |
| 2003/0199316 | A1 | 10/2003 | Miyamoto et al. |
| 2004/0100025 | A1 | 5/2004 | Conklin |
| 2004/0102234 | A1 | 5/2004 | Gold |
| 2004/0150163 | A1 | 8/2004 | Kenny et al. |
| 2004/0160006 | A1 | 8/2004 | Kenny et al. |
| 2004/0178582 | A1 | 9/2004 | Garrod |
| 2004/0217548 | A1 | 11/2004 | Snow |
| 2004/0224777 | A1 | 11/2004 | Smith et al. |
| 2005/0029741 | A1 | 2/2005 | Snow et al. |
| 2005/0032563 | A1 | 2/2005 | Sines |
| 2005/0032564 | A1 | 2/2005 | Sines |
| 2005/0051958 | A1 | 3/2005 | Snow |
| 2005/0051962 | A1 | 3/2005 | Chapman |
| 2005/0104292 | A1 | 5/2005 | Schultz |
| 2005/0107148 | A1 | 5/2005 | Webb |
| 2005/0146093 | A1 | 7/2005 | Grauzer et al. |
| 2005/0164759 | A1 | 7/2005 | Smith et al. |
| 2005/0164762 | A1 | 7/2005 | Smith et al. |
| 2005/0218596 | A1 | 10/2005 | Adam |
| 2005/0242506 | A1 | 11/2005 | Yoseloff et al. |
| 2005/0269782 | A1 | 12/2005 | Sklansky |
| 2006/0084506 | A1 | 4/2006 | Yoseloff et al. |
| 2006/0108740 | A1 | 5/2006 | Kekempanos |
| 2006/0119044 | A1 | 6/2006 | Kekempanos et al. |
| 2006/0145417 | A1 | 7/2006 | Grauzer et al. |
| 2006/0178183 | A1 | 8/2006 | Van Asdale |
| 2006/0186599 | A1 | 8/2006 | Kenny et al. |
| 2006/0267285 | A1 | 11/2006 | Webb et al. |
| 2006/0270477 | A1 | 11/2006 | Snow |
| 2006/0281513 | A1 | 12/2006 | Kirkpatrick |
| 2006/0281534 | A1 | 12/2006 | Grauzer et al. |
| 2006/0284376 | A1 | 12/2006 | Snow |
| 2007/0024005 | A1 | 2/2007 | Snow |
| 2007/0069462 | A1 | 3/2007 | Downs et al. |
| 2007/0102882 | A1 | 5/2007 | Snow |
| 2007/0210520 | A1 | 9/2007 | Webb |
| 2009/0156310 | A1 | 6/2009 | Fargo |
| 2010/0105460 | A1* | 4/2010 | Makhoul et al. ................ 463/13 |

FOREIGN PATENT DOCUMENTS

| | | |
|---|---|---|
| DE | 3003376 | 8/1981 |
| EP | 338644 | 10/1993 |
| GB | 667345 | 2/1952 |
| GB | 2097570 | 4/1982 |
| GB | 2184029 | 6/1987 |
| GB | 94/14822 | 7/1994 |
| GB | 94/26324 | 12/1994 |

OTHER PUBLICATIONS

Copyright filing with the Bureau voor de Intellectuele Eigendom, Aruba, 13 pgs (Jan. 13, 1998).
Hoyle's Modern Encyclopedia of Card Games by Walter Gibson, p. 250, 3 pages.
KISS Guide to Gambling by John Marchel, "No-Limit", DK Publishing, Inc., 2001, p. 344.
Published Rule Sheet for Casino Poker from Vegas World, 1 page (1982).
Scarne's Guide to Modern Poker, Constable and Company Limited, 1980, "Brag", pp. 159-160.
Show Five Cards, Scarne's Encyclopedia of Games, John Scarne, Harper & Row Publishers, pp. 28-29, 1973.
Three Card Poker Disclosure by Derek J. Webb.
Victory H. Royer, "How to Play Casino Poker—Texas Hold-em", received in the PTO Jul. 11, 1996, http://www.vegas.com/vegascom/bestbascholdem.
Prime Table Games—Disclosure in Respect to Three Card Games, Derek J. Webb, Feb. 10, 2009.
"Three-Card Poker," Three-Card Monte, "Brag", Scarne's Encyclopedia of Games, John Scarne, Harper & Row Publishers, p. 28-31, 1973.
Flop-A-Lock, 2006 (1 page).
www.riversideresport.com/gaming/live-games Deuces Wild Hold 'Em Fold 'Em, obtained Jan. 16, 2007 {4 pages).
www.lakesentertainment.com/games.wpt; World Poker Tour; 2005 (6 pages).
www.progressivegaming.net/pages/games/texasholdem.html; 2005 (2 pages).
www.galaxygaming.com/texasshootout.html; Texas Shootout; 2005 {5 pages).
www.oldvegaschips.com; Poker Rules & Poker Questions Answered; Texas Hold'em; Omaha High; Deuces Wild Poker; Caribbean Poker; Poker Rules, How to play poker, how to play Texas Hold'em Poker; 42 pages.
Gibson, W.B. (1974) Hoyle's Modern Encyclopedia of Card Games, pp. 252, 257, 258.
New Jersey Register (vol. 30, No. 14, Jul. 20, 1998). Rule Adoption, Other Agencies, Cazsino Control Commission, Accounting and Controls, Gaming Equipment, Rules of the Games, Fast Action Hold'Em {pp. 1-15) (Westlaw 30 N.J.R. 2639 (b)). 2005 Thomson/West.
www.findarticles.com/p/articles/mi_mOEIN/is_2004_July_26/ai_n6122536/print; Mikohn Launches Texas Hold 'Em Bonus Poker Table Game.
Tre Card Stud TM Procedures Manual, Mikohn Gaming, Mar. 7, 2000.
Bad Beat Texas Hold 'Em; Rack Card; Shuffle Master, Inc.; 2005.
Information Disclosure Statement Apr. 7, 1988 Describing "Sklansky's Casino Poker" and "Video Poker."
Scarne's Encyclopedia of Games, Harper & Row, N.Y., Copyright 1973, p. 381, and title pages.
"Over/Under 13 Blackjack" Brochure; Gaming Concepts, Inc. 1988.
Scarne's Encyclopedia of Card Games, 299-304, 383 (1983).
Scarne's New Complete Guide to Gambling, 440-45 {1974).
Casino Journal, vol. 8, No. 12, Dec. 1992, "Working within the systems: IGT's Linked Progressive Programs Take Leap to the Tables," pp. 10-15, 40, 41.
State of New Jersey Casino Control Commission Prn 217205 Civil Action IGT's Second Amended Petition for the Authorization for the Implementation of the Game of Progressive-21 Filed Sometime after Aug. 4, 1991.

* cited by examiner

METHODS OF PLAYING WAGERING GAMES

CROSS-REFERENCE TO RELATED APPLICATIONS

This application is a continuation-in-part of U.S. patent application Ser. No. 13/399,141, filed Feb. 17, 2012, pending, which is a continuation of U.S. patent application Ser. No. 11/108,159, filed Apr. 15, 2005, abandoned, which is a continuation-in-part of U.S. patent application Ser. No. 10/938,483, filed on Sep. 10, 2004, now U.S. Pat. No. 7,264,243, issued Sep. 4, 2007, the entire disclosure of each of which is hereby incorporated herein by this reference.

TECHNICAL FIELD

The present invention relates to wagering games, particularly wagering games using playing cards or images of playing cards, and wagering games played on casino tables, video machines, multi-player platforms or the internet.

BACKGROUND

Many different wagering games presently exist for use in both home and casino environments. Such games should necessarily be exciting, uncomplicated and easy to learn so as to avoid frustrating the players. Designing new games that meet these criteria and are sufficiently different from old games to entice players to play the new game is a particularly challenge.

BRIEF SUMMARY

A card game is played against a pay table, wherein the player receives a partial hand that is preferably completed by community cards (but may be completed by cards dealt directly to a hand or a combination of cards dealt directly to a hand and at least one community card or wild card). After placement of an ante wager, each player will have an opportunity to place a game or "play" wager before receiving another card for the player's hand (whether dealt directly to the player or as a community card revealed to all players). At least some or all game wagers may be an amount within a range of multiples of the player (such as one times, two times, three times, four times, or five times the amount of the ante wager). The range of wagers may remain the same or vary with the number of dealt cards or community cards revealed to the players.

DETAILED DESCRIPTION

The terms "gaming," "gambling," or the like, refer to activities, games, sessions, rounds, hands, rolls, operations, and other events related to wagering games such as web games, casino games, card games, dice games, and other games of chance for which wagers may be placed by a player. In addition, the word "wager," "bet," "bid" or the like, refer to any type of wagers, bets or gaming ventures that are placed on random events, whether of monetary or non-monetary value. Points, credits, and other items of value may be purchased, earned, or otherwise issued prior to beginning the wagering game. In some embodiments, purchased points, credits, or other items of value may have an exchange rate that is not one-to-one to the currency used by the user. For example, a wager may include money, points, credits, symbols, or other items that may have some value related to a wagering game. Wagers may be placed in wagering games using real currency, virtual credits, or other countable elements.

There are at least some generic elements and combinations of elements of play within the scope of the game and technology disclosed. A card game is played only against a pay table. In other embodiments, additional side bets against a dealer hand are played simultaneously with the game against a pay table, as described below. The pay table may be against only a final hand (e.g., best five-card hand out of five, six or seven cards), or may be against intermediate hands as well as the final hand (as disclosed in U.S. Pat. Nos. 5,988,643; 6,206,780; 6,705,943; and U.S. patent application Ser. No. 09/815,181, filed Mar. 22, 2001, now U.S. Pat. No. 7,175,522, issued Feb. 13, 2007; U.S. patent application Ser. No. 10/602,015, filed Jun. 23, 2003, now U.S. Pat. No. 7,246,799, issued Jul. 24, 2007; and Ser. No. 10/646,670, filed Aug. 22, 2003, now U.S. Pat. No. 6,986,514, issued Jan. 17, 2006), the disclosure of each of which is hereby incorporated by reference in their entirety.

Figure 1:
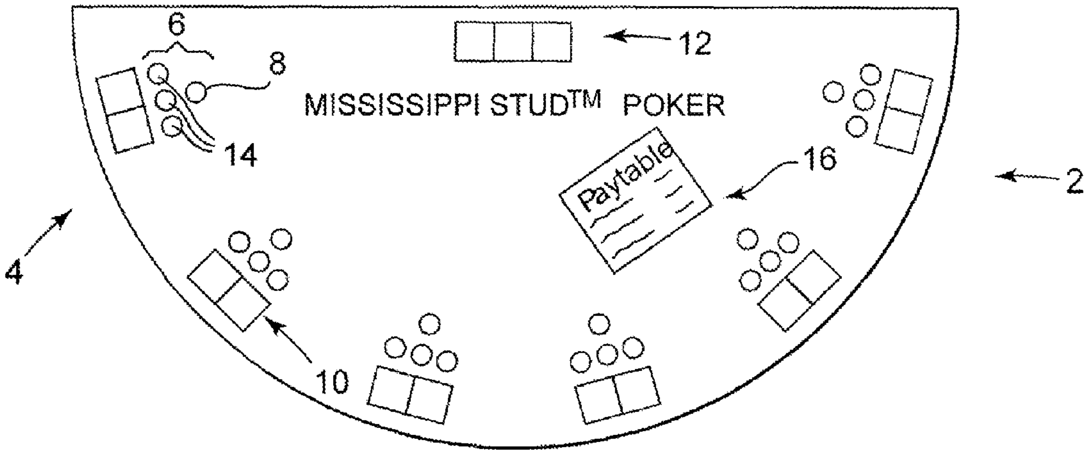
FIG. 1 shows a table layout for a game according to one embodiment.

FIG. 1 shows a table layout 2 for a game according to one embodiment. The table layout 2 is shown with an example of six player positions 4, with each player position 4 having a set of wager positions 6 comprising at least an ante wager position 8 and three play bet wager positions 14. Each player position has at least a card receiving area 10 and the dealer position has a community card receiving area 12. Rules of the game and payout tables are shown as an optional area 16.

In the play of the present games, the players placing at least an ante wager (e.g., bonus, play against a dealer hand and/or jackpot wagers may be separately placed, but need not be compulsory) and receive a partial hand. By a "partial hand" is meant that in the play of the game, additional cards are available or necessary to complete a final hand in the game. The partial hand is completed in certain games by community cards, but may be completed in other games by additional cards dealt directly to a hand, dealer cards, randomly generated virtual cards, additional bonus cards or a combination of cards dealt directly to a hand and at least one community card or wild card. Community cards are cards dealt and displayed on the table that are used by all players in the construction of intermediate and final hands.

After placement of an ante wager and review of only their initial partial hands, each player will have an opportunity to place a first game or "play" wager before receiving another card for the player's hand (whether dealt directly to the player, assigned as a community card revealed to all players or assigned otherwise such as by random display of a virtual card). At least some or all game wagers (including the first game wager) may be an amount within a range of multiples that may be chosen from the range by the player (such as within a range of one times, two times, three times, four times, or five times or higher times or fractional times the amount of the ante wager). It is possible in some forms of the game to allow the player to pass or "check," making no wager and yet remain in the game. The range of wagers may remain the same or vary with the number of dealt cards or community cards revealed to the players. For example, the first play wager may be any of one times to five times, or only one times to two times, and a second play wager (later discussed) may be limited to the size of the first play wager actually made, or may again be one times to five times, only one times to two times, or only one times or two times according to the house rules.

One series of play elements in the game described herein could be practiced as follows. A method of playing a casino table card game against a pay table comprises a player placing a first ante wager to play the card game against the pay table. In one example of the game, five-card poker rankings are used as the basis of constructing the pay table. The player receives an initial partial player's hand of cards, which the player views. Ordinarily, the initial partial hand of cards comprises enough cards to give the player some basis for evaluating the potential quality of the final player's hand. The player reviews the initial partial player's hand and makes an election to fold, to stay with no additional wager, or to place an additional wager (either a compulsory wager or an optional wager) before seeing any additional cards used to complete the initial partial player's hand. The player, after executing his decision, then views at least one first additional card from a set of additional cards to only partially complete the initial partial player's hand, forming a second partial player's hand. As additional cards are added, provided the player remains in the game, the player may form incremental partial hands until a final hand for the player is determined.

An additional play wager, before seeing the first additional card, is selected by the player from a range of amounts, such as one, two, or three times the ante wager. The method would then allow viewing the at least one first additional card as viewing a first additional player card or a first community card. After placing the additional play wager and viewing the first community card, the player makes a second election to fold, to stay with no additional wager, or to place a second additional wager before seeing any second additional card used to complete or partially complete the second initial partial player's hand. The second additional wager is again selected by the player from a range of amounts such as one, two, or three times the ante wager, although as indicated above, different ranges or limits may be imposed based upon other events or other rules, but there should still be an optional range available to the player. In this embodiment, viewing at least one second additional card comprises viewing a second community card. After placing the second additional wager and viewing the second community card, the player makes a third election to fold, to stay with no additional wager, or to place a third additional wager before seeing any third additional card used to complete the initial partial player's hand. The third additional wager is again selected by the player from a range of amounts, for example, comprising one times, two times, and three times the ante wager.

The game in this example game is played with two initial cards in the players' initial partial hands. In various embodiments, there may then be three, four, or five community cards, with three community cards being the number of cards in this example (as four and five cards would allow for a very high rank hand to be completed with one or two wagers still remaining, forming a five-card poker hand). The cards may be revealed one at a time or multiple cards at a time (especially with four or five community cards) to control the number of play wagers that may be available in the game. For example, with three community cards, there could be three play wagers when cards are revealed one card at a time, or two play wagers when a single card is revealed before one play wager (e.g., before the first or second play wager) and two cards are revealed before another play wager (e.g., before the second or first play wager, respectively). After the hand is complete (assuming that the player has placed all wagers necessary to remain in the game until conclusion of the disclosure of all community cards), all wagers are resolved against at least one pay table. There may be a single pay table for all wagers, or different pay tables for each wager. The ante wager may be paid at 1:1 if the player remains in the game until the revelation of the community cards is complete, or if the player attains at least a minimum hand (which may be less than the minimum hand on a typical pay table, such as an A-K), or may be paid at the pay table rate as are the other wagers.

An example of a pay table with two initial cards and three community cards revealed one at a time could be as follows:

PAY TABLE I

| FINAL HAND | PAYOUT ODDS |
|---|---|
| ROYAL FLUSH | 100:1 |
| STRAIGHT FLUSH | 50:1 |
| FOUR OF A KIND | 12:1 |
| FULL HOUSE | 7:1 |
| FLUSH | 5:1 |
| STRAIGHT | 4:1 |
| THREE OF A KIND | 3:1 |
| TWO PAIR | 2:1 |
| PAIR OF SIXES OR BETTER | 1:1 |

Another example of a pay table for the ante wager and the play wagers, with two initial player cards and three community cards revealed, first one card and then both cards could be:

PAY TABLE II

| FINAL HAND | PAYOUT ODDS |
|---|---|
| ROYAL FLUSH | 150:1 |
| STRAIGHT FLUSH | 70:1 |
| FOUR OF A KIND | 15:1 |
| FULL HOUSE | 8:1 |
| FLUSH | 5:1 |
| STRAIGHT | 4:1 |
| THREE OF A KIND | 3:1 |
| TWO PAIR | 2:1 |
| PAIR OF SIXES OR BETTER | 1:1 |

In addition to these pay tables, as noted before, the payout for the ante wager may be different than for the remaining wagers. In addition, there may be an automatic ante bonus payout (one times or two times) for any initial pair in the first two cards.

The following example will show the steps of example game play according to an embodiment.

A game played according to the following teachings herein is referred to as MISSISSIPPI STUD™ poker, which is a casino table card game that can also be played on a video system, a home computer, on a multiplayer platform gaming system, as a hand-held practice game, or as a game offered on the Internet. The game is played against a pay table, with specific rules and game play elements. There is no player versus dealer competition. In MISSISSIPPI STUD™, after placing an ante wager each player is provided two initial cards. The players may play the initial two cards by placing a bet of 1, 2, or 3 times the ante, or the player may fold. Players must place a play bet to continue the hand. One community card, "third street" is revealed. To continue, a player must place a second play bet of 1, 2, or 3 times the ante, or the player may fold. A second community card, "fourth street" is revealed. To continue, a player must place a third play bet of 1, 2, or 3 times the ante, or the player may fold. A third community card, "fifth street," is revealed. The player's hand is determined by combining the player's two cards with the three community cards and evaluated to determine a hand ranking. The player's hand ranking is paid based on the pay table for the game. Thus, each time a new card is provided to the player, the player may bet 1×-3× the player's wager to continue or the player may fold.

EXAMPLE 1

There are four players at a gaming table. Each player places an initial ante wager of $10, $10, $25, and $50, respectively, and the following initial two card hands are dealt to each player, with their initial decisions on play wagers shown beneath the hands. In Example 1, the players may make play bets up to three times the ante, according to house rules. The three (3) community cards may be dealt at this time, face down.

| Player 1 $10 | Player 2 $10 | Player 3 $25 | Player 4 $50 |
|---|---|---|---|
| 10♠ 10♥<br>$30 (3X) | 6♣ 4♠<br>Fold, no play wager | J♦ Q♦<br>$50 (2X) | A♥ 9♣<br>$50 (1X) |

Player 1 will make the maximum wager, as his hand is a guaranteed win on all wagers.

Player 2 will fold, as there is an extremely low likelihood of the hand being improved.

Player 3 has a good working hand, with two high cards, in suit, and a base for a straight. Player 3 places an intermediate "play" wager of two times the ante.

Player 4 has a decent working hand, with two cards above the minimum pairs needed for a win. Player 4 chooses to make a play wager that is one times the ante.

After all of these wagers have been made (and without yet resolving the automatic win for player 1), the first community card is dealt, and it is a K♦. The hands of the players and their next wagers are shown in the following table:

| Player 1 $10 + $10 | Player 2 $10 | Player 3 $25 + $50 | Player 4 $25 + $25 |
|---|---|---|---|
| 10♠ 10♥ K♦<br>$30 (3X) | Folded | J♦ Q♦ K♦<br>$75 (3X) | A♥ K♦ 9♣<br>$25 (1X) |

Player 1 will make the maximum wager, as his hand is a guaranteed win on all wagers.

Player 2 has folded.

Player 3 has a good working hand, with three high cards, in suit, and a base for a straight, a flush, a straight flush or a royal flush, as well as a high pair. Player 3 chooses a play bet that is three times the ante.

Player 4 still has a decent working hand, with three cards above the minimum pairs needed for a win, but no winning hand yet. Player 4 makes a play wager of one times the ante.

After all of these wagers have been made (and without yet resolving the automatic win for player 1), the second community card is dealt, and it is a 10♦. The hands of the players and their next wagers are shown in the following table.

| Player 1 $70 | Player 2 $10 | Player 3 $150 | Player 4 $75 |
|---|---|---|---|
| 10♦ 10♠ 10♥ K♦<br>$30(3X) | Folded | 10♦ J♦ Q♦ K♦<br>$75 (3X) | A♥ K♦ 10♦ 9♣<br>$50 (1X) |

Player 1 will make the maximum wager, as his hand is a guaranteed win on all wagers.

Player 2 has folded.

Player 3 has an excellent working hand, with four high cards, in suit, and a base for a straight, a flush, a straight flush or a royal flush, as well as a high pair. Player 3 wagers three times the ante, hoping for a very big payout.

Player 4 still has a decent working hand, with four cards above the minimum pairs needed for a win, but no winning hand yet. He bets one times the ante.

After all of these wagers have been made (and without yet resolving the automatic win for player 1), the third community card is dealt, and it is a Q♥. The hands of the players and their next awards are shown in the following table.

| Player 1 $100 Bet | Player 2 $10 | Player 3 $225 | Player 4 $125 |
|---|---|---|---|
| 10♦ 10♠ 10♥<br>K♦ Q♥<br>$300 (3X) Won | Folded | 10♦ J♦ Q♦<br>K♦ Q♥<br>$225 (1X) Won | A♥ K♦ 10♦<br>9♣ Q♥<br>$0 All Bets Lost |

As can be seen, Player 1 has won three times each of his wagers (in an amount of $100) with three of a kind; Player 2 lost his initial ante wager of $10; Player 3 still won $225, even though the potential very high hand was not achieved; and Player 4 lost $125, as the hand did not end up with a pair of 6's or higher. The three times multiple was taken from Pay Table I above.

EXAMPLE 2

An optional format is for there to be two community cards and either a wild card (the presence of which would necessitate a change in the pay table to lower payouts) or an individual additional card dealt to each hand. In this form of the game, the player can bet up to three times the ante.

The game will otherwise be played similarly, using much the same beginning cards as in Example 1. There are four players at a gaming table. Each player places an initial ante wager of $10, $10, $25, and $50, respectively, and the following initial two-card hands are dealt to each player, with their initial decisions on play wagers shown beneath the hands. The two (2) community cards may be dealt at this time, face down, and the final card for each is retained in the dealing shoe or shuffler, to be delivered after the two community cards are exposed.

| Player 1 $10 | Player 2 $10 | Player 3 $25 | Player 4 $50 |
|---|---|---|---|
| 10♠ 10♥<br>$30 (3X) | 6♣ 4♠<br>Fold, no play wager | J♦ Q♦<br>$50 (2X) | A♥ 9♣<br>$50 (1X) |

Player 1 will make the maximum wager, as his hand is a guaranteed win on all wagers.

Player 2 will fold, as there is an extremely low likelihood of the hand being improved.

Player 3 has a good working hand, with two high cards, in suit, and a base for a straight.

Player 4 has a decent working hand, with two cards above the minimum pairs needed for a win.

After all of these wagers have been made (and without yet resolving the automatic win for player 1), the first community card is dealt, and it is a K♦. The hands of the players and their next wagers are shown in the following table.

| Player 1 $10 + $10 | Player 2 $10 | Player 3 $25 + $50 | Player 4 $25 + $25 |
|---|---|---|---|
| 10♠ 10♥ K♦ | | J♦ Q♦ K♦ | A♥ K♦ 9♣ |
| $30 (3X) | Folded | $75 (3X) | $25 (1X) |

Player 1 will make the maximum wager, as his hand is a guaranteed win on all wagers.

Player 2 has folded.

Player 3 has a good working hand, with three high cards, in suit, and a base for a straight, a flush, a straight flush or a royal flush, as well as a high pair.

Player 4 still has a decent working hand, with three cards above the minimum pairs needed for a win, but no winning hand yet.

After all of these wagers have been made (and without yet resolving the automatic win for player 1), the second community card is dealt, and it is a 10♦. The hands of the players and their next wagers are shown in the following table.

| Player 1 $70 | Player 2 $10 | Player 3 $150 | Player 4 $75 |
|---|---|---|---|
| 10♦ 10♠ 10♥ K♦ | | 10♦ J♦ Q♦ K♦ | A♥ K♦ 10♦ 9♣ |
| $30 (3X) | Folded | $75 (7X) | $50 (1X) |

Player 1 will make a maximum wager equal to three times the ante, as his hand is a guaranteed win on all wagers.

Player 2 has folded.

Player 3 has an excellent working hand, with four high cards, in suit, and a base for a straight, a flush, a straight flush or a royal flush, as well as a high pair.

Player 4 still has a decent working hand, with four cards above the minimum pairs needed for a win, but no winning hand yet.

After all of these wagers have been made (and without yet resolving the automatic win for player 1), the third additional card is dealt to each player's hand, and the individual cards are shown below in the table. The hands of the players and their next awards are shown in the following table.

| Player 1 $100 Bet | Player 2 $10 | Player 3 $225 Bet | Player 4 $125 Bet |
|---|---|---|---|
| 10♦ 10♠ 10♥ K♦ 6♥ | | 10♦ J♦ Q♦ K♦ 9♦ | A♥ K♦ 10♦ 9♣ Q♥ |
| $300 (3X) Won | Folded | $11,225 (50X) Won | $0 All Bets Lost |

As can be seen, Player 1 has won three times each of his wagers with three of a kind; Player 2 lost his initial ante wager of $10; Player 3 has won $11,225, with a straight flush achieved; and Player 4 lost $125, as the hand did not end up with a pair of sixes or higher.

If a wild card were present in the deck, either as a potential community card or as an individual card, the pay tables would have to be significantly altered to accommodate the likelihood of more winning hands and higher winning hands. For example, in the above case, if the third community card had been a wild card, Player 1 would have had a four of a kind, Player 3 would have had a royal flush, and Player 4 would have had a pair of aces.

One specific mode of play of a game within the concepts described herein includes events where after placing an ante wager, the players receive two cards face down (which they may view) and then three community cards are dealt face down. The players may view their hands to decide the likelihood of success of their hand against the pay table, and may fold or place a wager of from one times to three times the amount of the ante wager. After all players at the table have acted on their individual decisions, a first and second of the three community cards is revealed. The players then analyze their hands in combination with the revealed first and second community cards, and may again fold or place a wager of from one times to three times the amount of the ante wager. After all players at the table have acted on their individual decisions, a third of the three community cards is revealed. The players then analyze their hands in combination with the three revealed community cards, and may again fold or place a wager of from one times to three times the amount of the ante wager. After all players at the table have acted on their individual decisions, the third of the three community cards is revealed. This offers the opportunity on certain of the wagers to make wagers on hands that are known to be winning events. It also offers an opportunity for as much as an additional seven times the ante to be wagered during the course of the game (one times+three times+three times).

As previously noted, the present games and rules may be played as a live casino table card game, as a hybrid casino table card game (with virtual cards or virtual chips), on a multi-player platform (as disclosed in U.S. patent application Ser. Nos. 10/764,827; 10/764,994 (now U.S. Pat. No. 7,661,676, issued Feb. 16, 2010); and Ser. No. 10/764,995, all filed on Jan. 26, 2004, which applications are incorporated herein by reference), on a personal computer for practice, on a hand-held game for practice or on a legally authorized site on the Internet.

Although specific rules, steps, numbers of cards and the like have been presented at various points in this disclosure, those specific examples are not intended to limit the generic concepts disclosed and described herein. Those examples are not intended to be limiting, but supportive of the generic concepts disclosed and claimed.

For the purposes of this disclosure, it will be understood that when a game and any actions associated with the game are described, that game and its rules and actions are also useable in an electronic version of the game (an electronic or on-line version of the game or games using the same set of rules and/or game play).

Gaming actions and rules such as accepting wagers, making payouts, dealing cards, selecting cards, and other actions associated with a player or a dealer include physical and electronic embodiments. Thus, when a description is given of a player or dealer taking a game related action, it is intended that the embodiments include action on a live gaming table, a virtual table or display, and the generation, transmission, and reception of such an action in an electronic form where player and dealer choices, selections, or other actions are received at an electronic interface. This further includes the results of a virtual dealer and virtual players, where the actions described are actually generated by a computer (typically associated with an on-line game). As an example, if dealing of a card is described herein, the description includes providing a card to be associated (associable) with the applicable position in the game, such as a player, dealer, or a community. Such dealing includes (but is not limited to): the dealing of a card by a dealer from a deck, shuffler, or other card source and the reception or placement of the card at a table location associable with a player, or reception directly by a player; or, the generation and transmission of an electronic indication of a card from a game play source or server to an electronic receiver, where the receiver may be at a table (virtual cards) including players and/or virtual players and/or a dealer or virtual dealer, at a public display in a casino, at a remote location (on-line or internet game play), or other locations, and also including the representation of a card on a display or displays, and, if applicable to the action described, an electronic reception of an indication that the card has been received, selected, or otherwise interacted with at a location associable with a player, or, associated with a virtual player.

Figure 2:
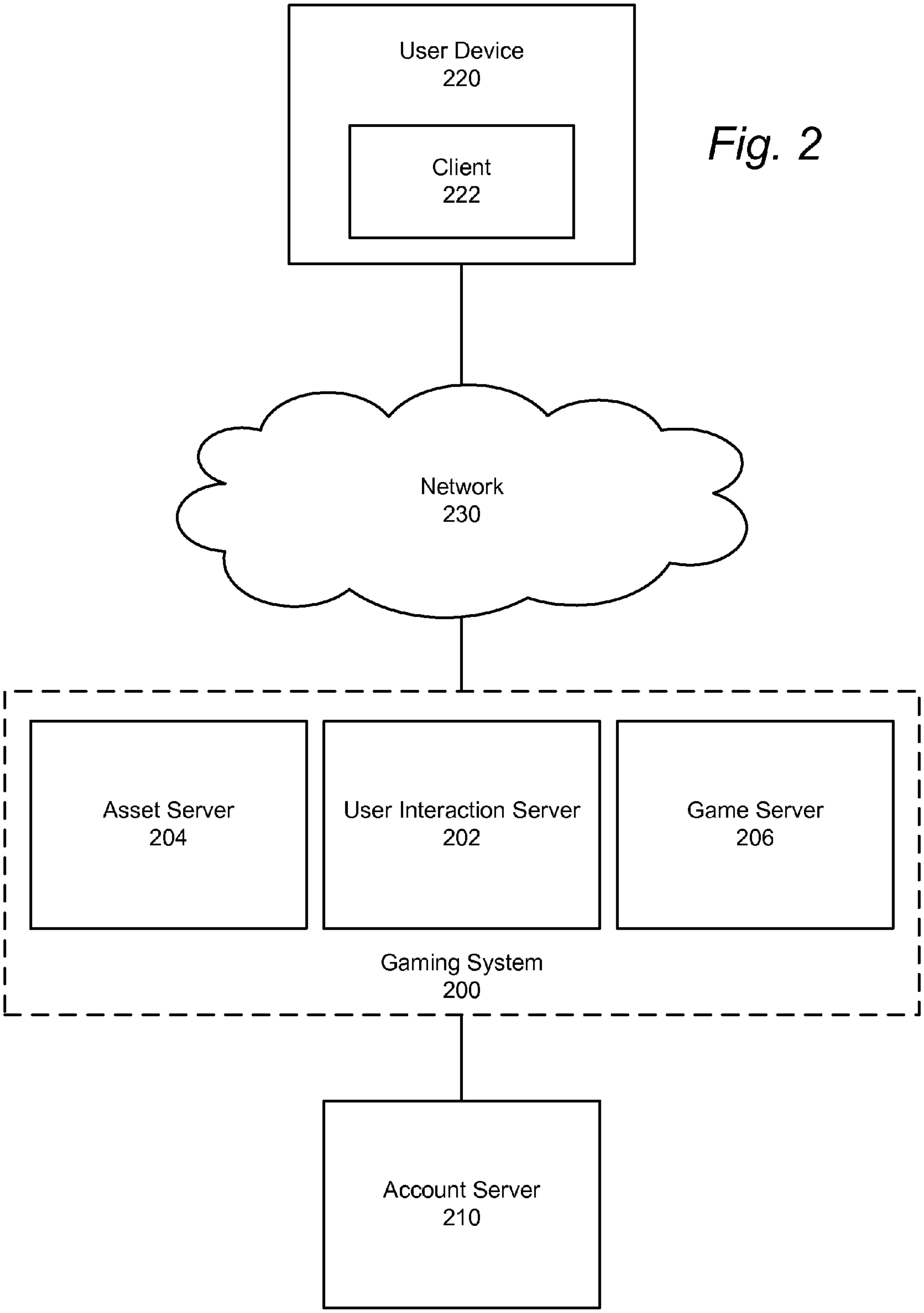
FIG. 2 is a schematic block diagram of a gaming system for implementing wagering games according to an embodiment.

FIG. 2 is a schematic block diagram of a gaming system 200 for implementing wagering games according to an embodiment. The gaming system 200 enables end users to access wagering game content. Such game content may include, without limitation, various types of wagering games such as card games, dice games, big wheel games, roulette, scratch off games, and any other wagering game with a randomized element in determining wagering outcomes. Such games in may be played against the gaming system or against other end users. In particular, the gaming system 200 allows users to play variants of the wagering games described above.

The wagering games supported by the gaming system 200 may be operated with real currency or with virtual credits. For example, the real currency option may include traditional casino and lottery-type wagering games in which money or other items of value are wagered and may be cashed out at the end of a game session. The virtual credits option may include wagering games in which credits (or other symbols) may be issued to a player to be used for the wagers. For example, credits may be purchased by a player or issued through other methods. Although credits may be won or lost, the ability of the player to cash out the credits may be prevented. In other words, while the credits may be purchased, the credits in a play for fun option may be limited to non-monetary credits in terms of the ability of the player to extract cash or goods or services of monetary value out of the wagering game. Systems that operate play for fun games may include issuance of free credits. In some embodiments, a limited number free credits may be issued in order to entice players to play the games. Credits may be won or lost, but credit balances may not be cashed out. In exchange for identifying friends who may want to play, the system may issue additional credits. Often, additional credits may be issued after a period of time has elapsed to encourage the player to resume playing the game. The system may enable players to buy funds or additional game credits to allow the player to resume play. Objects of value may be awarded to play for fun players, which may or may not be in a direct exchange for credits. For example, the client may award a prize for a highest scoring play for fun player during a defined time interval.

The gaming system 200 includes a gaming platform that establishes a portal for an end user to access a wagering game hosted by a game server 206 through a user interaction server 202. The user device 220 communicates with a user interaction server 202 of the gaming system 200 using a network 230. The user interaction server 202 communicates with the game server 206 and provides game information to the user. In some embodiments, a single user device communicates with a game provided by the game server 206, while other embodiments may include a plurality of user devices 220 configured to communicate and provide end users with access to the same game provided by game server 206. In addition, a plurality of end users may access a single user interaction server 202 or a plurality of user interaction servers 202 to access game server 206.

The user interaction server 202 communicates with the user device 220 to enable access to the gaming system 200. The user interaction server 202 allows a user to create and access a user account and interact with gaming server 206. The user interaction server 202 allows users to initiate new games, join existing games, and interface with games being played by the user.

The user interaction server 202 may also provide a client 222 for execution on the user device for accessing the gaming system 200. The client 222 provided by the gaming system 200 for execution on the user device 220 can comprise a variety of implementations according to the user device and method of communication with the gaming system 200. In one embodiment, the user device 220 connects to the gaming system 200 using a web browser and the client 1122 executes within a browser window or frame of the web browser. In another embodiment, the client 222 is a stand-alone executable on the user device 220.

For example, the client 222 may comprise a relatively small amount of script (e.g., JavaScript), also referred to as a "script driver," including scripting language that controls an interface of the client 222. The script driver may include simple function calls requesting information from the gaming system 200. In other words, the script driver stored in the client 222 may merely include calls to functions that are externally defined by, and executed by, the gaming system 200. As a result, the client 222 may be characterized as a "thin client." As that term is used herein, the client 222 may be little more than a script player. The client 222 may simply send requests to the gaming system 200 rather than performing logic itself. The client 222 receives player inputs and the player inputs are passed to gaming system 200 for processing and executing the wagering game. In other embodiments, the client 222 comprises an executable rather than a script. As a result, the bulk of the processing of the game play is performed in the gaming system 200. The client 222 may receive intermediate data and final game outcome information from the gaming system 200 for displaying on the end user's computer after such is determined by the game server 206.

In another embodiment, the client 222 implements further logic and game control methodology beyond the thin client described above. For example, the client 222 may parse and define player interactions prior to passing the player interactions to the gaming system 200. Likewise, when the client 222 receives a gaming interaction from the gaming system 200, the client 222 may be configured to determine how to modify the display as a result of the gaming interaction. The client 222 may also allow the player to change a perspective or otherwise interact with elements of the display which do not change aspects of the game.

The gaming system 200 also includes an asset server 204 which hosts various media assets (e.g., audio, video, and image files) that may be sent to the client 222 for presenting the various wagering games to the end user. In other words, in this embodiment the assets presented to the end user are stored separately from the client 222, and the client 222 requests the assets appropriate for the game played by the user. For example, the client 222 may call a function defined at the user interaction server 202 or asset server 204 which determines what assets are to be delivered to the client 222 as well as how the assets are to be presented by the client 222 to the end user. Different assets may correspond to the various clients that may have access to the game server 206 or to different games to be played.

The game server 206 is configured to perform game play methods and determine game play outcomes that are provided to the user interaction server 202 to be transmitted to user device 220 for display on the end user's computer. For example, the game server 206 may include game rules for one or more wagering games, such that the game 206 controls the game flow for a selected wagering game, as well as the determining game outcomes, pay tables, and other game logic. The game server 206 also performs random number generation for determining random game elements of the wagering game. The game server 206 is typically separated from the user interaction server 202 by a firewall or other method of preventing unauthorized access to the game server 206 from the general members of the network 230.

The user device 220 presents a gaming interface to the player and communicates the user interaction to the gaming system 200. The user device 220 may be any electronic system capable of displaying gaming information, receiving user input and communicating the user input to the gaming system 200. As such, the user device 220 can be a desktop computer, a laptop, tablet computer, set-top box, mobile device, kiosk, terminal, or other computing device. The user device 220 operates the client 222 for connecting to the interactive gaming system 200 as described above. The client 222 may be a specialized application or may be executed within a generalized application capable of interpreting instructions from the interactive gaming system 200, such as a web browser.

The client 222 may interface with an end user through a web page, an application (e.g., a smartphone or tablet application), or other computer program in order to access the gaming system 200. The client 222 may be illustrated within a casino webpage (or other interface) indicating that the client 222 is embedded into a webpage, which is supported by a web browser executing on the client device 220.

The gaming system 200 may be operated by different entities in one embodiment. The user device 220 may be operated by a third party, such as a casino, that links to the gaming system 200. Therefore, in some embodiments, the user device 220 and client 222 is operated by a different administrator than the operator of the game server 206. In other words, the user device 220 may be part of a third-party system that does not administer the game server 206. In another embodiment, the user interaction server 202 and asset server 204 are provided by a third-party system. For example, a gaming entity (e.g., a casino) may operate the user interaction server 202 or user device 220 to provide its customers access to game content managed by a different entity. In some embodiments, these functions are operated by the same administrator. For example, a gaming entity (e.g., a casino) may elect to perform each of these functions in-house, such as providing both the access to the user device 220 and the actual game content and providing administration of the gaming system 200.

The gaming system 200 also communicates with external account servers 210, optionally through another firewall. For example, the gaming system itself may not take wagers or issue payouts. In other words, the gaming system 200 may facilitate online casino gaming, but may not be part of a self-contained online casino itself. Instead, the gaming system 200 may facilitate the play of proprietary card game content owned and controlled by a company offering games and gaming products and services, such as Shuffle Master, Inc. Another entity (e.g., a casino) may operate and maintain its external account servers 210 to take bets and make payout distributions. The gaming system 200 may communicate with the account servers 210 to verify the existence of funds for wagering, and instructs the account servers 210 to execute debits and credits.

In some embodiments, the gaming system 200 may take bets and make payout distributions, such as in the case where administrator of the gaming system 200 operates as a casino. As discussed above, the gaming system 200 may be integrated within the operations of a casino rather than separating out functionality (e.g., game content, game play, credits, debits, etc.) among different entities. In addition, for "play for fun" wagering games, the gaming system 200 may issue credits, take bets, manage the balance of the credits according to the game outcomes, but may not permit payout distributions or be linked to play for fun account servers 210 that permit payout distributions. Such credits may be issued for free, through purchase, or for other reasons, without the ability for the player to cash out. Such play for fun wagering games may be played on platforms that do not permit traditional gambling, such as to comply with jurisdictions that do not permit online gambling.

The gaming system 200 may be configured using a distributed server architecture. For example, the game server 206 may be include a plurality of servers (e.g., game rules server, deck server, game routing server, account server, asset server, etc.) that are logically separated to perform different functions for the wagering game. Additional features may be supported by the game server 206, such as hacking and cheating detection, data storage and archival, metrics generation, messages generation, output formatting for different end user devices, as well as other features and operations. For example, the gaming system 200 may include additional features and configurations as described in U.S. patent application Ser. No. 13/609,031, filed Sep. 10, 2012, and entitled "Network Gaming Architecture, Gaming Systems, and Related Methods," the entire disclosure of which is incorporated herein by this reference.

The network 230 enables communications between the user device 220 and the gaming system 200. A network may also connect gaming system 200 and account server 210 (not shown). In one embodiment, the network 230 uses standard communications technologies and/or protocols. Thus, the network 230 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 230 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 230 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 230 can also include links to other networks such as the Internet.

Figure 3:
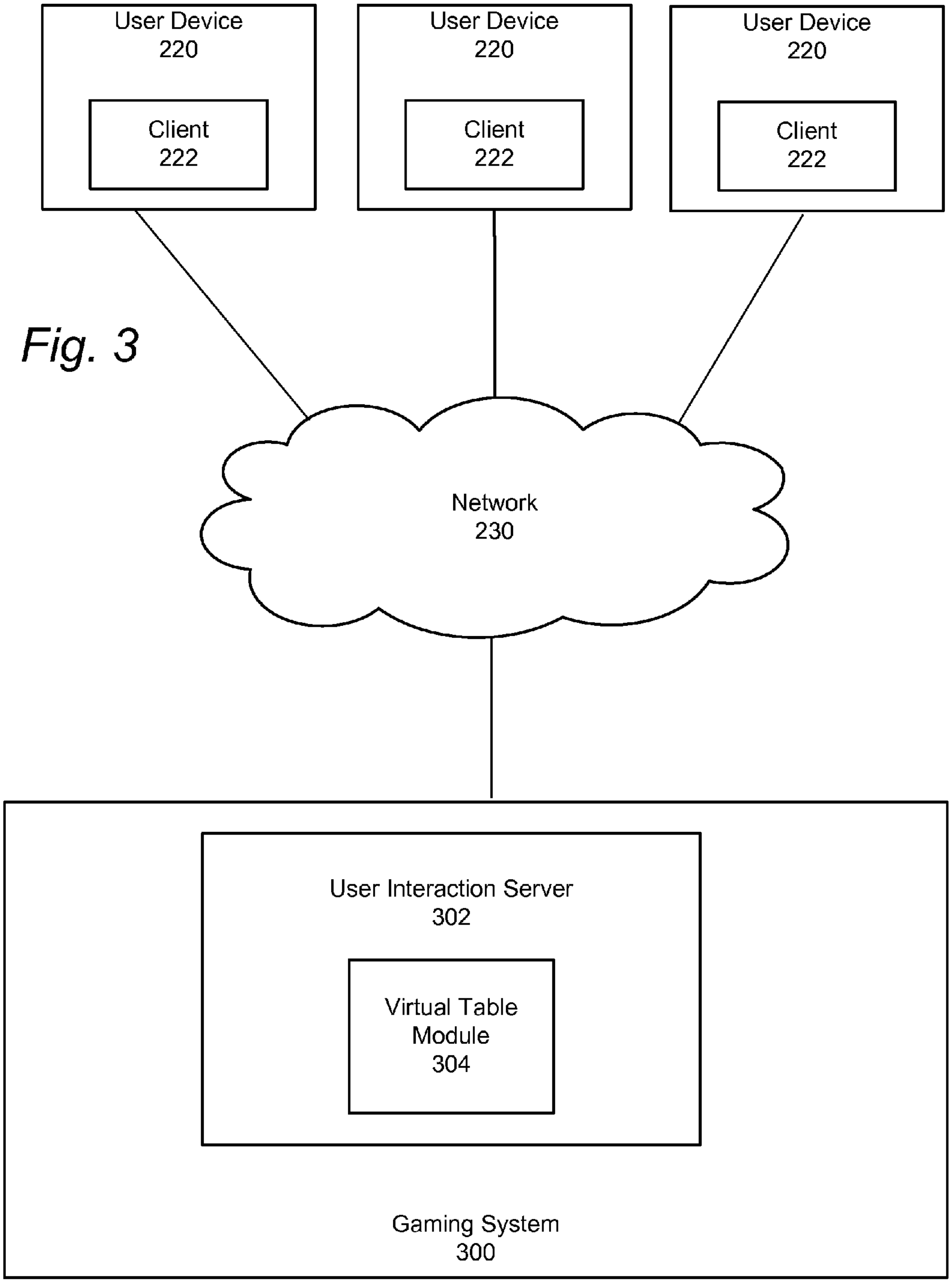
FIG. 3 illustrates a block diagram of a gaming system that offers wagering games according to one embodiment.

FIG. 3 illustrates a block diagram of a gaming system 300 that offers wagering games according to one embodiment. The gaming system 300 provides gaming services to a plurality of user devices 220 in a similar manner to the gaming system 200 described above with respect to FIG. 2. Accordingly, common components between gaming system 300 and gaming system 200 may include an asset server 204, gaming engine 206, and a communication with an account server 210. The user interaction server 302 provides similar functionality to user devices 220 as provided by user interaction server 202. User interaction server 302 includes additional functionality using a virtual table module 304 for providing a virtual table to the user devices 220.

The virtual table module 304 creates and manages virtual tables for use by the user devices 220. A virtual table is a simulation of a table as may be used on a casino floor. As such, the virtual table allows a specific number of players to join a game hosted by the gaming system 300. The game may be operated by the game server 206. A lobby may be provided to the player of the user device 220, allowing the user to browse various tables that may be joined by the player. Once a player joins a virtual table, the virtual table module 304 provides a virtual table interface to the user device.

The virtual table interface provided by the virtual table module 304 displays appropriate play areas to the user according to the game being played by the user. For example, a user choosing to play a game as described above, and shown with respect to FIG. 1 may be shown play areas for multiple players in the game. To take particular actions relative to the action in the game, the player takes action in gameplay areas associated with the particular player. In addition, when the dealer takes actions, the dealer's actions are relayed to each of the other players. In certain games, a player may take actions in the game simultaneously and in others the player must wait for the game's action to be on the player before the player may act. The virtual table interface provides the user the ability to view virtual actions taken by other players in addition to actions taken by the player himself. Using the virtual table module 304, the gaming system 300 provides a virtual experience to the user similar to play on a casino floor.

In addition to actions taken responsive to the gameplay, players may also view other information provided by the other players. For example, like sitting at a table in person, the players at the virtual table may chat with one another, for example via a chat interface, and optionally communicate with an audio connection if a microphone and speakers are available at the user devices 220. In addition, for games where a player is provided a card or cards face-down, the player may also choose to reveal the player's card(s) to the other players at the table. Thus, the virtual table enables the players to engage in interactions with others players at the table as though the players were actually in person together at a table at the casino floor.

In one embodiment, the virtual table module 304 provides the players with an image of a virtual dealer. The virtual dealer provides interaction with the various players of the game, indicating, for example, when it is a player's turn to take an action. The user interface for each player may be customized for each player's perspective at the virtual table. For example, the player at the first seat at the table is provided a view different from the second seat, the third seat, etc. As such each player may have a different view of the table, as well as a perspective on the virtual dealer. Thus, when the virtual dealer is indicating that the second seat must act in the game, to the player in the second seat the perspective indicates the virtual dealer is gesturing to that player, while a player in the first seat is provided a different perspective of the virtual dealer indicating to the second seat.

Figure 4:
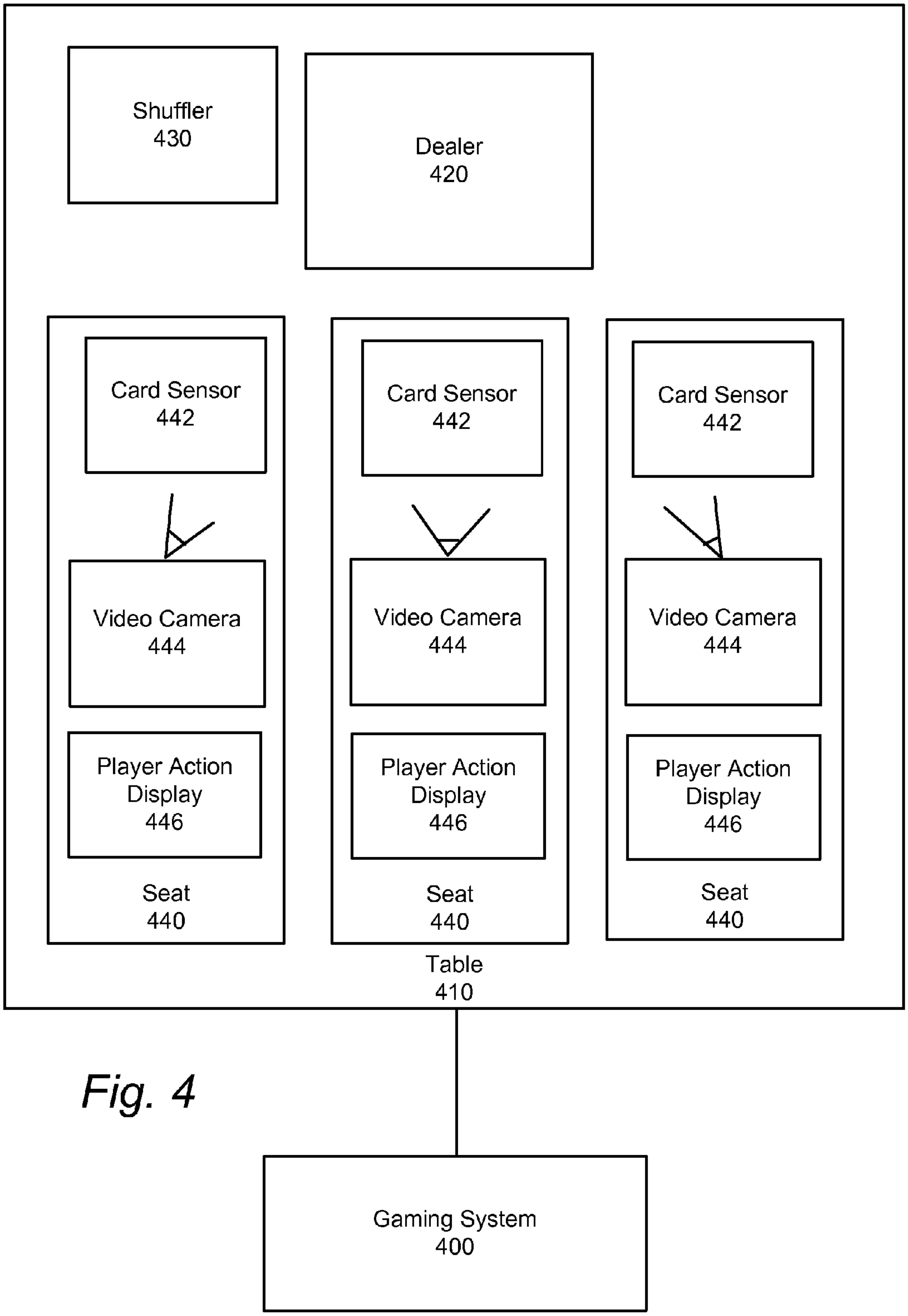
FIG. 4 is a block diagram of a gaming system providing for live dealer play for a user at a remote user device according to one embodiment.

FIG. 4 is a block diagram of a gaming system providing for live dealer play for a user at a remote user device according to one embodiment. In this embodiment, the wagering games described herein are provided to a player on a user device (not shown) by a live dealer 420 at a table 410. In this embodiment, the live dealer 420 and table 410 provide the game engine functionality to the gaming system 400 by executing game mechanics and providing game action and results to the gaming system 400. The live dealer 420 receives cards from a shuffler 430 and distributes the cards to players according to the gameplay rules. When players join and leave the game, players join a seat 440 at the table 410. The table 410 includes the number of seats 440 according to the number of seats 440 allotted to the particular game being played.

In this embodiment, each seat at the table 410 includes a card sensor 442, a video camera 444, and a player action display 446. The player at a seat 440 is provided a view of the table from video camera 444. The video camera 444 provides a video feed to the user device operated by the player showing the player action on the table 410 and provides the player a view of the dealer 420 and the shuffler 430. Thus, the player receives a live view of activities at the table 410 while the user plays the game.

The card sensor 442 includes positions for the dealer 420 to place cards as the cards are dealt to the dealer. The card sensor 442 may be in view of the video camera 444, or the card sensor 442 may not be in view of the video camera 444. When the card sensor 442 is in view of the video camera 444, the dealer 420 may deal the cards to the positions face-up so the video camera 444 may view the cards dealt to the player. When the card sensor 442 is not viewable by the player, the card sensor 442 may be placed underneath the camera and provide the illusion that the dealer 420 is providing cards to the player, as the cards are dealt underneath the video camera 444 and leave the video camera's 444 view. The cards dealt to the player are transmitted to the gaming system 400 and subsequently the user device and displayed to the player. The particular cards dealt to the player may be determined in various ways. In one embodiment, the shuffler 430 includes a card reader that identifies particular rank and suit (and any other relevant characteristics) of a card as the card leaves the shuffler. The shuffler may also know the seat that the card will be dealt to. As such, the shuffler 430 may provide the card information to the gaming system 400. When the card is dealt to the seat 440, the card sensor 442 detects the presence of the card (e.g. by blocking light to a sensor at the card position). The card sensor 442 indicates the presence of the card to the shuffler 430 and the shuffler 430 indicates the card provided to the seat 440 to the gaming system 400.

Alternatively, the card sensor 442 may detect the rank and suit of the card. The card sensor 442 identifies the cards by a variety of means. In one embodiment, the card sensor 442 comprises a translucent panel placed over a scanner. When a card is played over the card sensor 442, the scanner reads the card through the translucent panel and provides the card information to the gaming system 400. In another embodiment, the card sensor 442 includes a radio-frequency identification (RFID) reader (or interrogator). In this embodiment, each card includes a RFID tag responsive to the RFID reader, the tag indicating the card's rank and suit when interrogated by the RFID reader. When the dealer places the card on the position of the card for the seat 440, the RFID reader interrogates the RFID tag in the card and obtains the card's characteristics. The card's characteristics are provided to the gaming system 400 for communication with the user device of the player at the seat 440. Other card identification methods may be used by the card sensor 442 to identify the card placed at seat 440.

The seat 440 also includes a player action display 446. As players place wagers, and execute game actions on the respective user devices, the players' activities are transmitted to the player action display 446. The player action display 446 is a visual display for the dealer 420 of the player's action. For example, the action display may indicate when a user has placed a bet, folded, or interacted with the game according to actions permitted by the game rules. In one embodiment, the player action display 446 also provides a video feed to the dealer 420 of a camera at the user device. The camera may be used to show, for example, the user as the user plays the game, thus enabling a face-to-face view of the player to the dealer though the player is not at the table 410. In one embodiment, the player action display 446 shows the amount of time since a user has taken an action. The amount of time the user has taken an action is used by the dealer to determine whether to wait for the player or whether to continue with play when the player has been idle. The player actions may also be shown to each user device to indicate the actions taken by other players during the game.

The shuffler 430 is an automatic card shuffler that shuffles cards for the game being played. The shuffler 430 includes, in one embodiment, a card reader that indicates individual cards or groups of cards as the cards are dealt by the shuffler 430. The shuffler 430 may also be programmed for the rules of the game being dealt and may be able to determine, for example, the particular cards to be dealt to individual players. The shuffler 430 provides the card information to the gaming system 400. Thus, the gaming system 400 using the table 410 allows a user to be remotely located at a user device while maintaining a live casino feel by viewing action at the table 410. Since actual cards are shuffled by shuffler 430 and a dealer 420 deals the cards, the user is able to enjoy a live game playing format. The dealt cards are provided to the user device operated by the user and the user's actions are provided to the table 410 by the player action display 446. The dealer 420 uses the player action display 446 to determine what actions to take to complete the game. Because the player has a view of the dealer 420, the dealer 420 can also interact directly with players and respond to particular players. For example, the dealer may gesture to a particular player that it is that player's turn to perform an action in the game. In addition, the user may communicate with the dealer 420, either by speaking to the dealer using a microphone, or the player may provide a message to the dealer through the player action display 446. For example, a player who does not know how to play the game may type a query into the user device, and query may appear in the player action display 446, and the dealer 420 may explain the game rules to the video camera 444 of the seat 440 for the player requesting the information. Thus, players can play the wagering games of this description in an environment simulating live play.

Figure 5:
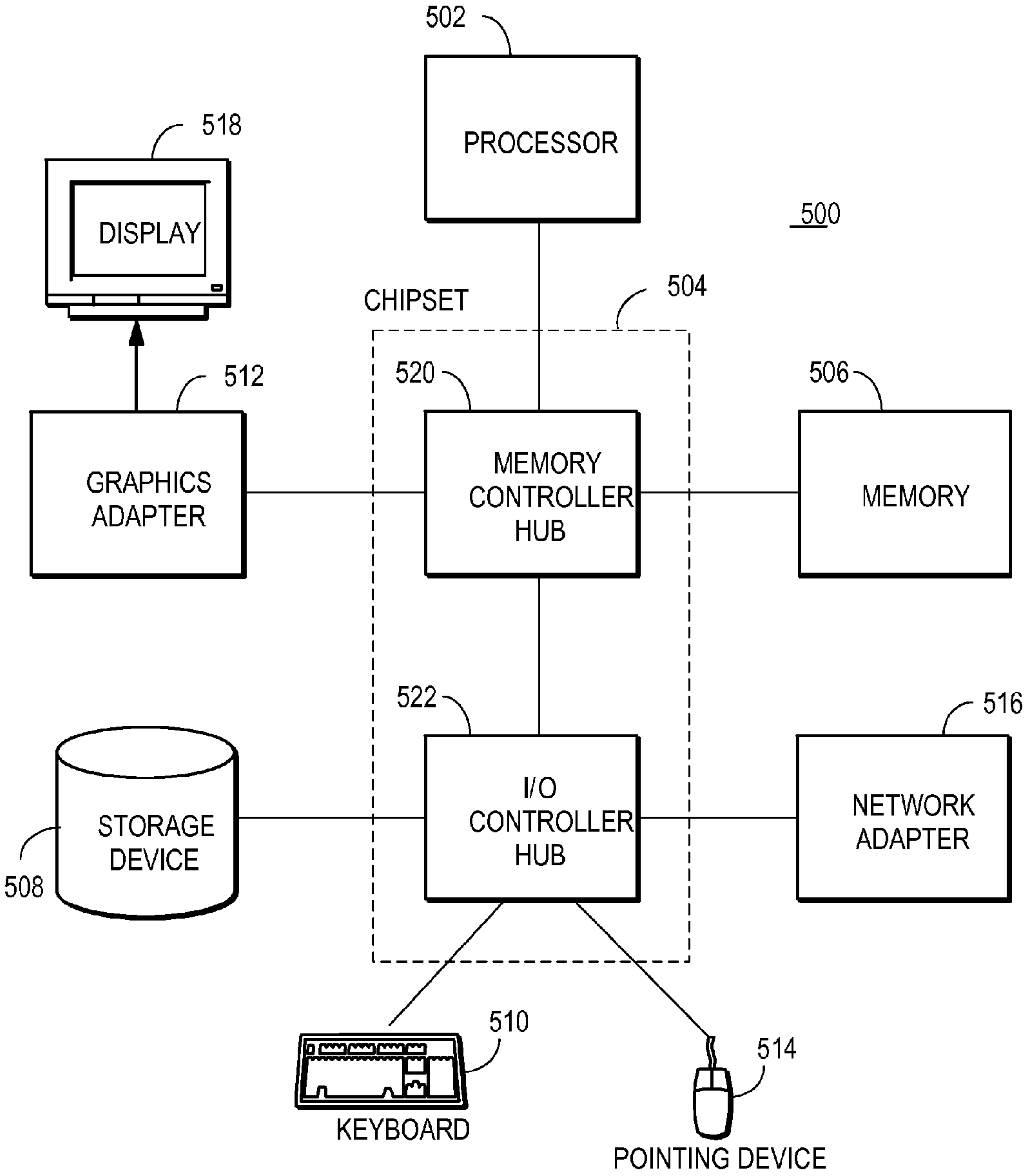
FIG. 5 is a high-level block diagram of a computer for acting as a gaming system according to one embodiment.

FIG. 5 is a high-level block diagram of a computer 500 for acting as a gaming system 200, 300, or 400 according to one embodiment. Illustrated are at least one processor 502 coupled to a chipset 504. Also coupled to the chipset 504 are a memory 506, a storage device 508, a keyboard 510, a graphics adapter 512, a pointing device 514, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The pointing device 514 may be a mouse, track ball, or other type of pointing device, and is used in combination with the keyboard 510 to input data into the computer system 500. The graphics adapter 512 displays images and other information on the display 518. The network adapter 516 couples the computer system 500 to a local or wide area network.

A computer 500 can have different and/or other components than those shown in FIG. 5. In addition, the computer 500 can lack certain illustrated components. In one embodiment, a computer 500 acting as a gaming system lacks a keyboard 510, pointing device 514, graphics adapter 512, and/or display 518. Moreover, the storage device 508 can be local and/or remote from the computer 500 (such as embodied within a storage area network (SAN)).

A gaming system may comprise several such computers 500. The gaming system may include load balancers, firewalls, and various other components for assisting the gaming system to provide services to a variety of user devices.

The computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relates to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A computer-implemented method of playing a wagering game solely against a plurality of predetermined winning outcomes, the method comprising:

receiving, by a processor from a user device, an ante wager associable with a player;

providing, by the processor for display on the user device, an initial partial hand of randomized cards associable with the player;

receiving a fold or additional wager associable with the player;

providing, by the processor for display on the user device, at least one first additional card which is insufficient to complete the initial partial player hand;

after receiving the additional wager and providing the at least one first additional card, receiving a fold or a second additional wager associable with the player;

providing, by the processor for display on the user device, at least one second additional card completing the partial hand; and resolving all wagers solely against the plurality of predetermined winning outcomes and not against a dealer hand, and paying the completed hand associable with the player if the completed hand is one of the predetermined winning outcome.

2. The method of claim 1, wherein the plurality of predetermined winning hand outcomes are paid according to odds associated with a pay table.

3. The method of claim 1, wherein the additional wager is an amount from an available range of specific amounts consisting of 1×, 2× and 3× the Ante wager.

4. The method of claim 1, wherein the at least one first additional card comprises a community card.

5. The method of claim 1, wherein the second additional wager is in an amount from an available range of specific amounts consisting of 1×, 2× and 3× the Ante wager.

6. The method of claim 1, wherein the at least one second additional card comprises a community card.

7. The method of claim 6, further comprising, after the second additional wager is received and providing the at least one second community card, receiving a fold or a third additional wager associable with the player before providing at least one third additional card to complete the partial hand.

8. The method of claim 7, wherein the a third additional wager is in an amount from an available range of specific amounts consisting of 1×, 2× and 3× the Ante wager.

9. The method of claim 1, wherein resolution of all wagers is made after a poker hand of five cards for the player is assembled from a total of between five and seven cards available to the player.

10. A computer-implemented method of playing a wagering game solely against a plurality of predetermined winning outcomes, the method comprising:

receiving, by a processor from a user device, an ante wager associable with a player;

providing, for display to a dealer, an indication of the user's ante wager;

receiving, from a card sensor at a player position, an indication of an initial partial hand of cards associable with the player;

providing the initial partial hand to the user device;

receiving a fold or additional wager associable with the player;

receiving, from the card sensor, at least one first additional card which is insufficient to complete the initial partial player hand;

providing the at least one first additional card to the user device;

after receiving the additional wager and providing the at least one first additional card, receiving a fold or a second additional wager associable with the player;

receiving, from the card sensor, at least one second additional card completing the partial hand;

providing the at least one second additional card to the user device; and resolving all wagers solely against the plurality of predetermined winning outcomes and not against a dealer hand, and paying the completed hand associable with the player if the completed hand is one of the predetermined winning outcome.

11. The method of claim 10, wherein the plurality of predetermined winning hand outcomes are paid according to odds associated with a pay table.

12. The method of claim 10, wherein the additional wager is an amount from an available range of specific amounts consisting of 1×, 2× and 3× the Ante wager.

13. The method of claim 10, wherein the at least one first additional card comprises a community card.

14. The method of claim 10, wherein the second additional wager is in an amount from an available range of specific amounts consisting of 1×, 2× and 3× the Ante wager.

15. The method of claim 10, wherein the at least one second additional card comprises a community card.

16. The method of claim 15, further comprising, after the second additional wager is received and providing the at least one second community card, receiving a fold or a third additional wager associable with the player before receiving at least one third additional card from the card sensor and providing the at least one third additional card to complete the partial hand.

17. The method of claim 16, wherein the a third additional wager is in an amount from an available range of specific amounts consisting of 1×, 2× and 3× the Ante wager.

18. The method of claim 10, wherein resolution of all wagers is made after a poker hand of five cards for the player is assembled from a total of between five and seven cards available to the player.

* * * * *